United States Patent
Goto (10) Patent No.: US 10,422,189 B2
(45) Date of Patent: Sep. 24, 2019

(54) THREADED CONNECTION FOR PIPE OR TUBE AND METHOD FOR PRODUCING THE THREADED CONNECTION FOR PIPE OR TUBE

(71) Applicants: Nippon Steel & Sumitomo Metal Corporation, Tokyo (JP); Vallourec Oil and Gas France, Aulnoye-Aymeries (FR)

(72) Inventor: Kunio Goto, Tokyo (JP)

(73) Assignees: Nippon Steel Corporation, Tokyo (JP); Vallourec Oil and Gas France, Aulnoye-Aymeries (FR)

(*) Notice: Subject to any disclaimer, the term of this patent is extended or adjusted under 35 U.S.C. 154(b) by 0 days.

(21) Appl. No.: 16/064,775

(22) PCT Filed: Dec. 16, 2016

(86) PCT No.: PCT/JP2016/087611
§ 371 (c)(1),
(2) Date: Jun. 21, 2018

(87) PCT Pub. No.: WO2017/110686
PCT Pub. Date: Jun. 29, 2017

(65) Prior Publication Data
US 2019/0010767 A1  Jan. 10, 2019

(30) Foreign Application Priority Data
Dec. 25, 2015 (JP) .................. 2015-254027

(51) Int. Cl.
*E21B 17/042* (2006.01)
*C23C 28/00* (2006.01)
(Continued)

(52) U.S. Cl.
CPC ............ *E21B 17/042* (2013.01); *C23C 28/00* (2013.01); *C23C 28/021* (2013.01);
(Continued)

(58) Field of Classification Search
CPC ..... E21B 17/042; C23C 28/00; C23C 28/021; F16L 15/04; F16L 15/001; C25D 3/565; C25D 5/12; C25D 7/003; C25D 7/04
See application file for complete search history.

(56) References Cited

FOREIGN PATENT DOCUMENTS

| CN | 1529798 A | 9/2004 |
|---|---|---|
| CN | 101627246 A | 1/2010 |

(Continued)

OTHER PUBLICATIONS

English Abstract of CN101627246A.
English Abstract of CN1529798A.

*Primary Examiner* — Michael C Miggins
(74) *Attorney, Agent, or Firm* — Banner & Witcoff, Ltd.

(57) ABSTRACT

The present invention has an objective to provide a threaded connection for pipe or tube including a pin and a box, having excellent galling resistance, torque property, and anticorrosion property, and still having an excellent adhesiveness with a lubricating coating even when being repeatedly exposed to high temperature and very low temperature, and to provide a method for producing the threaded connection for pipe or tube. The threaded connection for pipe or tube according to the present embodiment includes a pin and a box. The pin and the box have contact surfaces including a thread portions and and unthreaded metal contact portions, respectively. The threaded connection for pipe or tube comprises an electroplating layer consisting of a Zn—Ni alloy, a mechanical plating layer consisting of Zn or a Zn (Continued)

alloy, and a lubricating coating, on the contact surface of at least one of the pin and the box, in this order from a contact surface side.

9 Claims, 4 Drawing Sheets

(51) Int. Cl.
| | | |
|---|---|---|
| *F16L 15/04* | (2006.01) | |
| *C23C 28/02* | (2006.01) | |
| *C25D 3/56* | (2006.01) | |
| *C25D 5/12* | (2006.01) | |
| *C25D 7/00* | (2006.01) | |
| *C25D 7/04* | (2006.01) | |
| *F16L 15/00* | (2006.01) | |

(52) U.S. Cl.
CPC .......... *C23C 28/023* (2013.01); *C23C 28/321* (2013.01); *C23C 28/322* (2013.01); *C23C 28/34* (2013.01); *C25D 3/565* (2013.01); *C25D 5/12* (2013.01); *C25D 7/003* (2013.01); *C25D 7/04* (2013.01); *F16L 15/001* (2013.01); *F16L 15/04* (2013.01)

(56) References Cited

FOREIGN PATENT DOCUMENTS

| JP | 2002-221288 A | 8/2002 |
|---|---|---|
| WO | 2009072486 A1 | 6/2009 |

Torque Chart In Tightening

THREADED CONNECTION FOR PIPE OR TUBE AND METHOD FOR PRODUCING THE THREADED CONNECTION FOR PIPE OR TUBE

RELATED APPLICATIONS

This application is a National Stage Application under 35 U.S.C. 371 of co-pending PCT application PCT/JP2016/087611 designating the United States and filed Dec. 16, 2016; which claims the benefit of JP application number 2015-254027 and filed Dec. 25, 2015 each of which are hereby incorporated by reference in their entireties.

TECHNICAL FIELD

The present invention relates to a threaded connection for pipe or tube and a method for producing a threaded connection for pipe or tube.

BACKGROUND ART

For drilling an oil field or a natural gas field, oil country tubular goods are used. In proportion to the depth of a well, multiple steel pipes are coupled to form the oil country tubular goods. Coupling the steel pipes is conducted by fastening threaded connections for pipe or tube formed at end portions of the steel pipes. The steel pipes are drawn up and loosened for inspection or the like, and after the inspection, the pipes are fastened again and reused.

A threaded connection for pipe or tube includes a pin and a box. The pin has, on an outer peripheral surface of a front end portion of a steel pipe, a contact surface including an external thread portion and an unthreaded metal contact portion. The box has, on an inner peripheral surface of a front end portion of a steel pipe, a contact surface including an internal thread portion and an unthreaded metal contact portion. The thread portions and the unthreaded metal contact surfaces of the pin and the box repeatedly receive strong friction in fastening (making-up) and loosening (breaking-out) steel pipes. If these portions do not have a sufficient durability against friction, galling (unrepairable seizure) occurs when fastening and loosening are repeated. Therefore, a sufficient durability against friction, namely, excellent galling resistance is needed for a threaded connection for pipe or tube.

In conventional practices, to improve galling resistance, a compound grease called dope, containing heavy metals, has been used. By applying the compound grease on the surface of a threaded connection for pipe or tube, the galling resistance of the threaded connection for pipe or tube can be improved. However, heavy metals such as Pb, Zn, and Cu contained in the compound grease may exert an influence on the environment. For this reason, the development of a threaded connection for pipe or tube containing no compound grease has been desired.

Japanese Patent Application Publication No. 2002-221288 (Patent Literature 1) and International Application Publication No. WO2009/072486 (Patent Literature 2) propose threaded connections for pipe or tube excellent in galling resistance even without compound grease.

On the contact surfaces of the pin and the box of a threaded connection for pipe or tube described in Patent Literature 1, a porous Zn layer or a porous Zn alloy layer is formed on at least one of thread portions or unthreaded metal contact portions of the threaded connection for pipe or tube by a mechanical plating method, and on the layer, a solid lubricant coating or a liquefied lubricating coating containing no heavy metal powders (e.g., a coating containing a high-basic organometallic salt of a high-basic sulfonate or the like as its main agent) is formed. Patent Literature 1 describes that it is thereby possible to have a high anticorrosion property and suppress the occurrence of galling due to occurring or the reduction of gas-tightness at the time of repeating fastening/loosening while dispensing with-liquid lubricant, such as compound grease, containing heavy metal powders.

In a threaded connection for pipe or tube described in Patent Literature 2, the contact surface of a box includes, as an uppermost layer, a solid lubricant coating having plasticity or viscoplastic rheological behavior, and the contact surface of a pin includes, as an uppermost layer, a solid anticorrosive coating containing a UV cured resin as a main constituent. Patent Literature 2 describes that it is thereby possible to obtain a threaded connection for pipe or tube that suppresses the occurrence of rust without using compound grease, exerts excellent galling resistance and gas-tightness, has no stickiness on its surface, and is excellent in appearance and inspectability.

CITATION LIST

Patent Literature

[Patent Literature 1] Japanese Patent Application Publication No. 2002-221288
[Patent Literature 2] International Application Publication No. WO2009/072486

SUMMARY OF INVENTION

Technical Problem

The evaluation of galling resistance is usually conducted while steel pipes to be fastened are centered with each other. However, in actually fastening a threaded connection for pipe or tube, steel pipes (or a steel pipe and a coupling) to be fastened may not be centered with each other. This is called misalignment. When misalignment occurs, the contact surfaces a pin and a box (a thread portion and an unthreaded metal contact portion) receive strong friction as well as shear stress. This shear stress is remarkably larger than that in the case where no misalignment occurs. For this reason, when misalignment occurs, galling is more prone to occur. Therefore, a capability of suppressing galling even when misalignment occurs, namely, an anti-misalignment property is needed for a threaded connection for pipe or tube.

Meanwhile, the previously-described unthreaded metal contact portion includes a metal seal portion and a shoulder portion. In fastening a threaded connection for pipe or tube, the shoulder portions of a pin and a box come into contact with each other. A torque occurring at this point is called a shouldering torque. In fastening a threaded connection for pipe or tube, after the torque reaches the shouldering torque, the fastening is further performed until fastening is completed. This increases the gas-tightness of the threaded connection for pipe or tube. When the fastening is further performed, a metal constituting at least one of the pin and the box begins plastic deformation. A torque occurring at this point is called the yield torque.

A torque at the completion of fastening (called a fastening torque) is set so that a sufficient seal interfacial pressure can be obtained irrespective of the amount of thread interference. When the difference between a shouldering torque and a yield torque, namely, a torque-on-shoulder value is sufficiently large, there is room in the range of fastening torque. As a result, the adjustment of the fastening torque becomes easy. Therefore, in addition to the previously-described anti-misalignment property, a threaded connection for pipe or tube is required to have an excellent torque property.

Meanwhile, after produced, an oil well pipe is transported by a vessel or the like and is in storage for a certain period of time until it is used. The transportation and the storage of the oil well pipe may last for a long period. Furthermore, the storage of an oil well pipe may be performed in the open-air. When the storage is performed in the open-air for a long period, rust occurs in a threaded connection for oil country tubular goods, and the galling resistance and the gas-tightness of the threaded connection for oil country tubular goods may be reduced. Therefore, in addition to the previously-described galling resistance, a threaded connection for oil country tubular goods is required to have an excellent anticorrosion property even when being used in a cold area, warm area, and tropical area at atmospheric temperatures ranging about −20° C. to +50° C., as well as an extremely cold area where an atmospheric temperature can be −60° C. to −20° C.

On contact surfaces (a thread portion and an unthreaded metal portion), a lubricating coating is formed for the purpose of improving galling resistance. As previously described, when an oil well pipe is in storage in the open-air, the oil well pipe may be repeatedly exposed to high temperature and low temperature. When being repeatedly exposed to high temperature and low temperature, the adhesiveness of the lubricating coating may be reduced. The reduced adhesiveness of the lubricating coating results in the scaling-off of the lubricating coating in performing fastening. The scaling-off of the lubricating coating leads to the reduction in the anti-misalignment property of the threaded connection for pipe or tube, further resulting in an increased shouldering torque. Therefore, for a threaded connection for pipe or tube, high adhesiveness of solid lubricant coating is required even in the case of being subjected to repetitive temperature changes.

In the threaded connection for pipe or tube disclosed in Patent Literature 1, the Zn layer or the Zn alloy layer is porous. For this reason, the adhesiveness of the layer with the solid lubricant coating is satisfactory, providing sufficient galling resistance. However, because of being porous, a gap occurs between the Zn or Zn alloy layer and base material. For this reason, the base material at the occurring gap portion may corrode during a lapse of a long period.

The threaded connection for pipe or tube described in Patent Literature 2 has the adhesiveness and the lubrication property of excellent solid lubricant coating in a usage environment at a normal temperature. For this reason, the threaded connection for pipe or tube has sufficient galling resistance in a normal temperature environment. However, the environment temperature to be used of the threaded connection for pipe or tube may be high or may be low. The base material and the solid lubricant coating of the threaded connection for pipe or tube differ in coefficient of thermal expansion from each other. For this reason, when the environment temperature to be used of the threaded connection for pipe or tube is high, the adhesiveness of the solid lubricant coating is reduced. If the environment temperature to be used of a threaded connection for pipe or tube is high, the solid lubricant coating is further softened and oxidized. This further reduces the adhesiveness of the solid lubricant coating. On the other hand, if the environment temperature to be used of the threaded connection for pipe or tube is very low, the solid lubricant coating is hardened and embrittled. This reduces the adhesiveness of the solid lubricant coating. A reduced adhesiveness of the solid lubricant coating leads to the scaling-off or delamination of the solid lubricant coating, resulting in the reduction in the galling resistance of the threaded connection for pipe or tube. In addition, a threaded connection for pipe or tube may be exposed to high temperature in transportation and may be exposed to very low temperature in use. Therefore, a threaded connection for pipe or tube is required to have a high adhesiveness with a solid lubricant coating even when being repeatedly exposed to high temperature and very low temperature.

An objective of the present invention is to provide a threaded connection for pipe or tube having excellent galling resistance, torque property, and anticorrosion property, and still having an excellent adhesiveness with a lubricating coating even when being repeatedly exposed to high temperature and very low temperature, and to provide a method for producing the threaded connection for pipe or tube.

Solution to Problem

A threaded connection for pipe or tube according to the present embodiment includes a pin and a box. The pin and the box each includes a contact surface including a thread portion and an unthreaded metal contact portion. The threaded connection for pipe or tube comprises a first plating layer, a second plating layer, and a lubricating coating. The first plating layer is formed on at least one of the contact surfaces of the pin and the box, and is consisting of a Zn—Ni alloy. The second plating layer is formed on the first plating layer, and is a porous plating layer consisting of Zn or a Zn alloy. The lubricating coating is formed on the second plating layer. From a contact surface side, the first plating layer consisting of the Zn—Ni alloy, the second plating layer consisting of Zn or the Zn alloy, and the lubricating coating are stacked in this order.

A method for producing the threaded connection for pipe or tube according to the present embodiment is a method for producing a threaded connection for pipe or tube including a pin and a box. The pin and a box each includes a contact surface that includes a thread portion and an unthreaded metal contact portion. This producing method according to the present embodiment comprises an electroplating step, a mechanical plating step, and a lubricating coating forming step. In the electroplating step, a first plating layer consisting of a Zn—Ni alloy is formed by performing electroplating treatment on the contact surface of at least one of the pin and the box. In the mechanical plating step, mechanical plating treatment is performed after forming the first plating layer to form a second plating layer consisting of Zn or a Zn alloy. In the lubricating coating forming step, the lubricating coating is formed on the second plating layer.

Effects of Invention

A threaded connection for pipe or tube according to the present embodiment has excellent galling resistance, torque property, and anticorrosion property, and still has an excellent adhesiveness with a lubricating coating even when being repeatedly exposed to high temperature and very low temperature.

DESCRIPTION OF EMBODIMENTS

The present embodiment will be described below in detail with reference to the drawings. Identical or equivalent elements will be denoted by the same reference numerals and the description thereof will not be repeated.

Regarding a threaded connection for pipe or tube including a pin and a box, the present inventor conducted a variety of studies about the relation between galling resistance, torque property, anticorrosion property, and adhesiveness of lubricating coating. As a result, the present inventor obtained the following findings.

Figure 1:
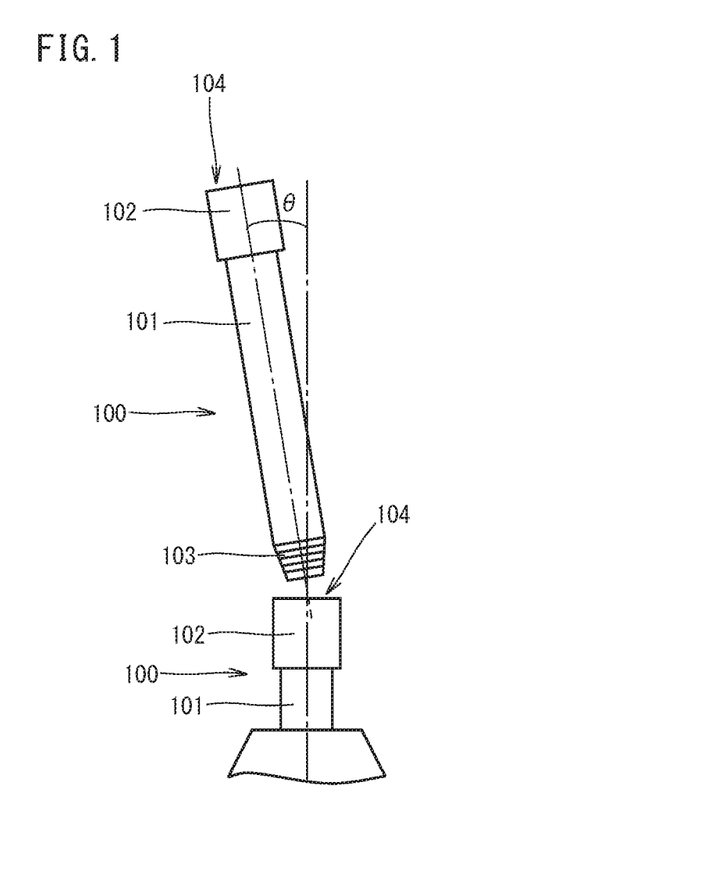
FIG. 1 is a schematic diagram of fastening of steel pipes when misalignment occurs.

Indexes of galling resistance include high-temperature resistance and anti-misalignment property. In conventional threaded connections for pipe or tube, although high-temperature resistance is sufficient, an anti-misalignment property is insufficient in some cases. FIG. 1 is a schematic diagram for illustrating misalignment. Referring to FIG. 1, steel pipes 100 each include a steel pipe body (hereafter, simply referred to as a main body) 101 and a coupling 102. The coupling 102 is made up and fixed to the upper end of the main body 101. The steel pipes 100 each include a pin 103 on an outer peripheral surface at the lower end (the lower end of the main body 101), and a box 104 on an inner peripheral surface at the upper end (the upper end of the coupling 102). As illustrated in FIG. 1, of the steel pipes 100 vertically arranged, the pin 103 of the upper steel pipe 100 is inserted into the box of the lower steel pipe 100, and fastened. This causes vertically arranged steel pipes 100 to be coupled to each other.

In fastening, it is preferable to perform the fastening with the upper steel pipe 100 and the lower steel pipe 100 coaxially arranged. However, there are some cases in reality that, in fastening, the central axis of the upper steel pipe 100 and the central axis of the lower steel pipe 100 are not aligned but toe. This is called misalignment. When fastening is performed with misalignment occurring, galling is prone to occur when compared to the case where no misalignment occurs.

To increase the anti-misalignment property of a threaded connection for pipe or tube, it is effective to form a plating layer having a high hardness and a high melting point on a contact surface having a thread portion and an unthreaded metal contact portion. If a plating layer has a high hardness, the plating layer on a contact surface is hard to be damaged in fastening and loosening. Furthermore, if a plating layer has a high melting point, the plating layer is hard to be melted out even when the temperature increases locally in fastening and loosening.

Thus, in a threaded connection for pipe or tube according to the present embodiment, a first plating layer consisting of a Zn—Ni alloy is formed on a contact surface. The first plating layer preferably has a porosity is less than 5%. A first plating layer having a porosity of less than 5% can be formed by electroplating treatment. Therefore, the first plating layer is an electroplating layer.

The Zn—Ni alloy constituting the first plating layer has a high hardness and a high melting point. It is therefore possible to increase the anti-misalignment property of the threaded connection for pipe or tube. Zinc (Zn) has a low hardness and a low melting point as compared with copper (Cu), which is conventionally used for plating layers. However, a Zn—Ni alloy, which is a Zn alloy, has a sufficiently high hardness and a sufficiently high melting point. For this reason, the first plating layer can increase the anti-misalignment property.

Using a Zn—Ni alloy enables the anticorrosion property of a threaded connection for pipe or tube to be increased. Zinc (Zn) is a base metal as compared with iron (Fe), nickel (Ni), and chromium (Cr). Therefore, when the first plating layer containing zinc (Zn) is formed on the contact surface, the plating layer corrodes in preference to a steel material (sacrificial protection). This increases the anticorrosion property of the threaded connection for pipe or tube.

Meanwhile, to increase lubricity, a lubricating coating is usually formed on a contact surface of a threaded connection for pipe or tube. The lubricating coating may be any one of a solid lubricant coating and a liquid lubricating coating. The lubricating coating may decrease in adhesiveness by repetitive exposure to high temperature and low temperature. The lubricating coating having a decreased adhesiveness is scaled off when the threaded connection for pipe or tube is fastened and loosened. In particular, in the case where the fastening is performed with misalignment occurring, the lubricating coating is prone to be scaled off. The scaling-off of the lubricating coating leads to a reduction in the lubricity of a thread portion of the threaded connection for pipe or tube.

The first plating layer is an electroplating layer, thus having a flat surface. Therefore, when the solid lubricant coating is formed on the first plating layer, the adhesiveness of the lubricating coating is prone to be reduced.

Thus, on the first plating layer, a porous second plating layer consisting of Zn or a Zn alloy is formed, and the lubricating coating is formed on the second plating layer. In this case, the adhesiveness of the lubricating coating is increased. The second plating layer is more porous than the first plating layer. The second plating layer preferably has a porosity of 5 to 80%. The second plating layer being more porous than the first plating layer can be formed by mechanical plating treatment. Therefore, the second plating layer is a mechanical plating layer. The second plating layer being a mechanical plating layer includes roughness on its surface. When the lubricating coating is formed on the surface including roughness, the adhesiveness is increased due to what is called the anchor effect. An increased adhesiveness of the lubricating coating suppresses the scaling-off of the lubricating coating even in the case of repetitive exposure to high temperature and low temperature. If the scaling-off of the lubricating coating is suppressed, a high lubricity is kept in fastening and loosening. For this reason, the anti-misalignment property of the threaded connection for pipe or tube is further increased.

Figure 2:
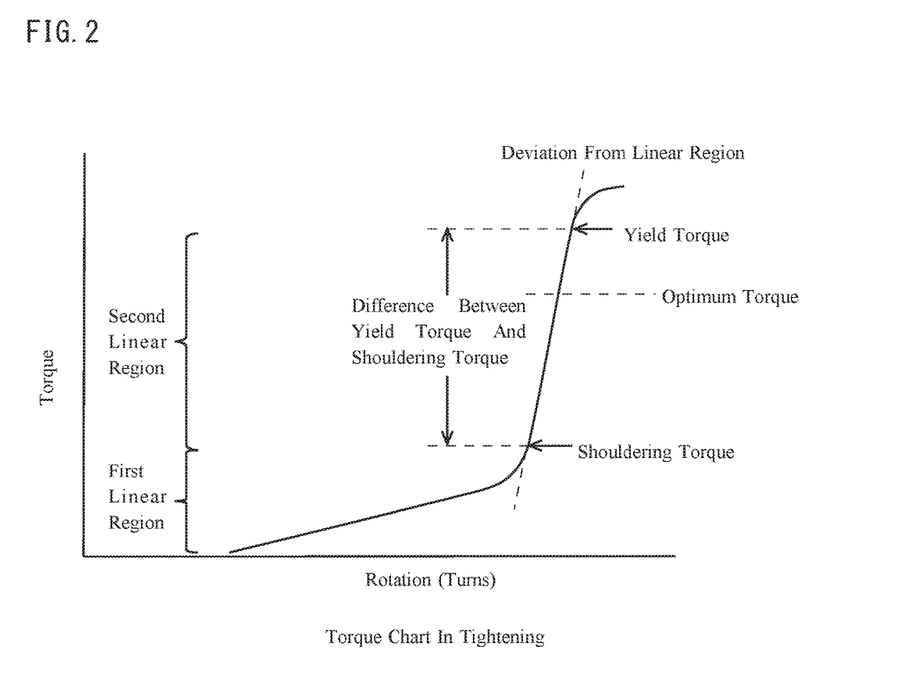
FIG. 2 is a graph illustrating the relation between the number of turns and torque in a threaded connection for pipe or tube.

Furthermore, if a high lubricity of the threaded connection for pipe or tube is kept, a yield torque in fastening rises. FIG. 2 is a graph illustrating the relation between the number of turns and torque in a thread portion of a threaded connection for pipe or tube. Referring to FIG. 2, when a pin and a box are fastened, the shoulder portions of the pin and the box come into contact with each other. A torque occurring at this point is called a shouldering torque. In fastening the thread portions of a threaded connection for pipe or tube, after the torque reaches the shouldering torque, the fastening is further performed until fastening is completed. This increases the gas-tightness of between the thread portions of the threaded connection for pipe or tube. When the fastening is further performed, a metal constituting at least one of the pin and the box begins plastic deformation. A torque occurring at this point is called the yield torque.

A torque at the completion of fastening (fastening torque) is set so that a sufficient seal interfacial pressure can be obtained irrespective of the amount of thread interference. When a torque-on-shoulder value, the difference between a shouldering torque and a yield torque, is sufficiently large, there is room in the range of fastening torque. As a result, the adjustment of the fastening torque becomes easy. Preferably, the yield torque is not excessively low. A sufficiently high adhesiveness of the lubricating coating allows the yield torque to be kept high even when fastening and loosening are repeated. That is, the adjustment of the fastening torque remains easy even after repetitive use, showing an excellent torque property.

The threaded connection for pipe or tube according to the present embodiment based on the above findings includes a pin and a box. The pin and the box each have a contact surface including a thread portion and an unthreaded metal contact portion. The threaded connection for pipe or tube comprises a first plating layer consisting of a Zn—Ni alloy on the contact surface of at least one of the pin and the box, a porous second plating layer consisting of Zn or a Zn alloy on the first plating layer, and a lubricating coating on the second plating layer. These are stacked in order of the first plating layer, the second plating layer, and the lubricating coating, from a contact surface side.

The threaded connection for pipe or tube according to the present embodiment includes the first plating layer on its contact surface. The Zn—Ni alloy constituting the first plating layer has a high hardness and a high melting point. For this reason, the threaded connection for pipe or tube is excellent in anti-misalignment property. In addition, the Zn—Ni alloy has a sacrificial protection effect. For this reason, the threaded connection for pipe or tube according to the present embodiment is also excellent in anticorrosion property. The threaded connection for pipe or tube according to the present embodiment further includes the second plating layer between the first plating layer and the lubricating coating, the second plating layer consisting of Zn or a Zn alloy. The second plating layer is more porous than the first plating layer. For this reason, the adhesiveness of the lubricating coating to a threaded connection for pipe or tube is increased as compared with the case where the lubricating coating is formed directly on the first plating layer. The second plating layer is porous, thus showing a sufficient torque-on-shoulder value, and showing an excellent torque property.

The second plating layer is a mechanical plating layer formed by mechanical plating treatment. Examples of the mechanical plating treatment include blasting treatment using metallic particles to be plated. In this case, the formed second plating layer is porous, and the surface thereof has roughness. Therefore, the adhesiveness of the lubricating coating is increased due to the anchor effect. The mechanical plating treatment may be other well-known similar methods other than the blasting treatment using metallic particles.

The porosity of the second plating layer is preferably 5 to 80%, and more preferably 10 to 60%.

Preferably, the first plating layer has a thickness of 1 to 20 μm, the second plating layer has a thickness of 2 to 30 μm, and the lubricating coating has a thickness of 5 to 50 μm.

A method for producing the threaded connection for pipe or tube according to the present embodiment is a method for producing the previously described threaded connection for pipe or tube. This producing method comprises an electroplating step, a mechanical plating step, and a lubricating coating forming step. In the electroplating step, the electroplating treatment is performed to form the first plating layer consisting of a Zn—Ni alloy, on the contact surface of at least one of the pin and the box. In the mechanical plating step, mechanical plating treatment is performed after forming the first plating layer to form a second plating layer consisting of Zn or a Zn alloy. In the lubricating coating forming step, the lubricating coating is formed on the second plating layer.

Description will be made below in detail about a threaded connection for pipe or tube and a method for producing a threaded connection for pipe or tube, according to the present embodiment.

[Threaded Connection for Pipe or Tube]

Figure 3:
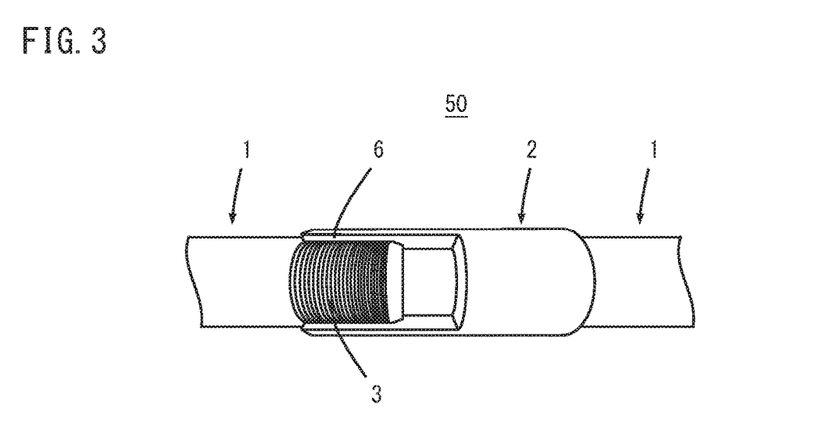
FIG. 3 is a diagram illustrating the configuration a threaded connection for pipe or tube according to the present embodiment.

A threaded connection for pipe or tube includes a pin and a box. FIG. 3 is a side view illustrating a partial cross section of a threaded connection for pipe or tube 50 according to the present embodiment. Referring to FIG. 3, the threaded connection for pipe or tube 50 includes a steel pipe body 1 (hereafter, simply referred to as a main body) and a coupling 2. At the both ends of the main body 1, a pin 3 is formed that includes an external thread portion on its outer surface. At the both ends of the coupling 2, a box 6 is formed that includes an internal thread portion on its inner surface. By fastening the pin 3 and the box 6, the coupling 2 is attached to the end of the main body 1. Besides, there is an integral-type threaded connection for oil country tubular goods, which does not include a coupling 2 but includes a pin 3 provided at one end of the main body 1 and a box 6 at the other end. The threaded connection for pipe or tube in the present embodiment is available for both of coupling-type threaded connections for pipe or tube and integral-type threaded connections for pipe or tube.

Figure 4:
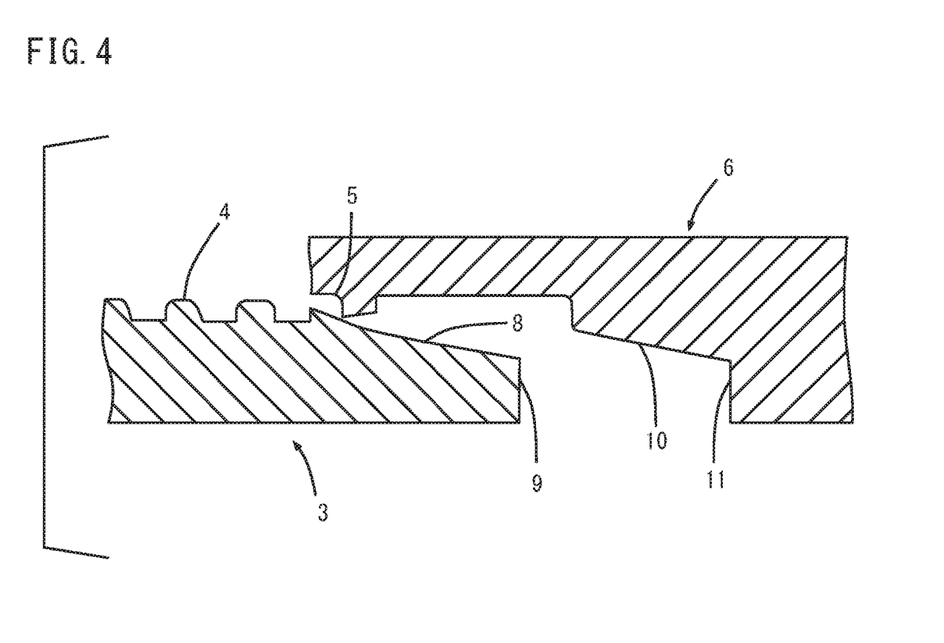
FIG. 4 is a cross-sectional view of the threaded connection for pipe or tube according to the present embodiment.

FIG. 4 is a cross-sectional view of the pin and the box of the threaded connection for pipe or tube 50 according to the present embodiment. Referring to FIG. 4, the pin 3 includes a contact surface. The contact surface is a portion that comes in contact when the pin 3 and the box 6 are fastened. The contact surface includes a thread portion (external thread) 4 and an unthreaded metal contact portion. The unthreaded metal contact portion is formed at a front end of the pin 3, including a metal seal portion 8 and a shoulder portion 9. Similarly, the box 6 includes a contact surface. The contact surface includes a thread portion (internal thread) 5 and an unthreaded metal contact portion (a metal seal portion 10 and a shoulder portion 11). As the pin 3 and the box 6 are fastened, both shoulder portions (the shoulder portions 9 and 11), both metal seal portions (the metal seal portions 8 and 10), and both thread portions (the external thread portion 4 and the internal thread portion 5) come into contact with each other, respectively.

Figure 5:
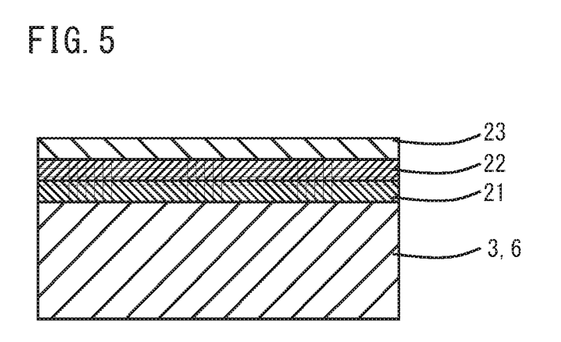
FIG. 5 is a cross-sectional view of a contact surface of the threaded connection for pipe or tube according to the present embodiment.

FIG. 5 is a cross-sectional view of a contact surface of the threaded connection for pipe or tube 50 according to the present embodiment. Referring to FIG. 5, the threaded connection for pipe or tube 50 includes, on the contact surface of at least one of the pin 3 and the box 6, a first plating layer 21, a second plating layer 22, and a lubricating coating 23, in this order from a contact surface side.

[First Plating Layer 21]

The first plating layer 21 is formed on the contact surface of at least one of the pin 3 and the box 6. The first plating layer 21 is an electroplating layer consisting of a Zn—Ni alloy. The first plating layer 21 has a high hardness and a high melting point. Therefore, the anti-misalignment property of the threaded connection for pipe or tube 50 is increased. Furthermore, since Zn contained in the first plating layer 21 is a base metal, the anticorrosion property of the threaded connection for pipe or tube 50 is increased.

The Zn—Ni alloy constituting the first plating layer 21 contains Zn and Ni, and the balance thereof is consisting of impurities. The impurities are, for example, Fe, S, O, C, and the like. Preferred Zn content in the Zn—Ni alloy is 85 mass %, and more preferably 90 mass %. Preferred Ni content in the Zn—Ni alloy is 10 to 15 mass %. The first plating layer 21 has a large content of Zn, thus being highly effective in sacrificial protection.

Zn and Ni contents in the first alloy layer 21 are measured by the following method. Measurement of Zn and Ni content, for example, is carried out by using a hand-held X-ray fluorescence analyzer (Olympus DP2000 (trade name DELTA Premium)). Any four positions (any of 0°, 90°, 180°, and 270° positions on the circumferential direction of a pipe) on a surface of a metal seal portion, which is plated with a Zn—Ni alloy layer, are measured for the composition analysis. The measured content of Zn and Ni is measured by a measurement mode of the alloy.

A preferable thickness of the first plating layer 21 is 1 to 20 μm. If the first plating layer 21 has a thickness of 1 μm or more, it is possible to increase the anti-misalignment property and the anticorrosion property of the threaded connection for pipe or tube 50 more stably. If the first plating layer 21 has a thickness of 20 μm or less, the adhesiveness of the first plating layer 21 is further stabilized. Therefore, a preferable thickness of the first plating layer 21 is 1 to 20 μm.

The thickness of the first plating layer 21 is measured by the following method. A probe of an overcurrent phase type film thickness measuring device, conforming to ISO (International Organization for Standardization) 21968 (2005), is contacted to a contact surface formed with a first plating layer 21. The phase difference between the high frequency magnetic field on the input side of the probe and the overcurrent, which is raised by the high frequency magnetic field on the first plating layer 21, is measured. This phase difference is converted into the thickness of the first plating layer 21. In a film thickness measurement on a threaded connection, any four positions (any of 0°, 90°, 180°, 270° positions on the circumferential direction of a pipe) on a metal seal portion are measured.

The porosity of the first plating layer 21 is preferably less than 5%. When a plating layer is formed by electroplating treatment, the plating layer has a porosity of less than 5%. "Porosity" in an electroplating layer includes space portions, such as a pin-hole, void portions between fine particles and opening portions inside the particulate mass body, which consist the plating layer.

The porosity of the first plating layer 21 can be measured by a known method.

[Second Plating Layer 22]

The second plating layer 22 is formed on the first plating layer 21. The second plating layer 22 is consisting of Zn or a Zn alloy. That is, the second plating layer 22 contains Zn or the Zn alloy, and the balance thereof is consisting of impurities. The impurities are, for example, Fe, S, O, C, or the like. The Zn alloy means an alloy having a content of Zn of 50% or more. The Zn alloy is, for example, a Zn—Fe alloy. The second plating layer 22 may be a plating layer consisting of pure Zn and impurities or may be a plating layer consisting of a Zn alloy and impurities. Zn content in the Zn alloy can be measured as in the Zn content in the first plating layer 21.

The second plating layer 22 is porous when compared with the first plating layer, and has roughness on its surface. The lubricating coating 23 is cured while fitting into the roughness, and thus the adhesiveness of the lubricating coating 23 is increased due to what is called the anchor effect, increasing the durability of the lubricating coating. Therefore, even in the case where of the threaded connection for pipe or tube 50 is subjected to repeated fastening and loosening, the scaling-off of the lubricating coating 23 is suppressed. Furthermore, even in the case where the lubricating coating 23 wears due to repeated fastening and loosening of the threaded connection for pipe or tube 50, portion of the lubricating coating 23 or wear debris of the lubricating coating 23 remain inside (in the pores of) the second plating layer 22. For this reason, the threaded connection for pipe or tube 50 keeps a high lubricity.

The second plating layer 22 is a mechanical plating layer formed by mechanical plating treatment. The mechanical plating layer is more porous than an electroplating layer. The porosity of the second plating layer 22 formed by the mechanical plating treatment is, for example, 5 to 80%. The porosity of the second plating layer 22 can be measured as in the above-mentioned porosity of the first plating layer 21.

A preferable thickness of the second plating layer 22 is 2 to 30 μm. If the second plating layer 22 has a thickness of 2 μm or more, it is possible to obtain the adhesiveness of the lubricating coating 23 and an appropriate torque-on-shoulder value of the lubricating coating 23, more stably. In contrast, if the second plating layer 22 has a thickness more than 30 μm, the above-described effect is saturated. Therefore, a preferable thickness of the second plating layer 22 is 2 to 30 μm. The thickness of the second plating layer 22 can be measured as of the above-mentioned thickness of the first plating layer 21.

[Lubricating Coating 23]

The lubricating coating 23 is formed on the second plating layer 22. By virtue of the lubricating coating 23, the lubricity of the threaded connection for pipe or tube 50 is increased. The lubricating coating 23 may be a solid lubricant coating or a liquid lubricating coating. Preferably, the lubricating coating 23 is a solid lubricant coating. As the lubricating coating 23, well-known ones can be used. The lubricating coating 23 contains, for example, a lubricating particle and a binding agent. The lubricating coating 23 may contain a solvent and other constituents as necessary.

The lubricating particle reduces the friction coefficient of the surface of the lubricating coating 23. The lubricating particle is not limited in particular as long as the particle has lubricity. The lubricating particle can be, for example, graphite, molybdenum disulfide ($MoS_2$), tungsten disulfide ($WS_2$), boron nitride (BN), polytetrafluoroethylene (PTFE), a graphite fluoride (CFx), calcium carbonate ($CaCO_3$), or a combination thereof. Preferably, graphite, a graphite fluoride, $MoS_2$ and PTFE are used. When the lubricant film 23 is set to be 100 mass %, the content of the lubricating particle is preferably 5 to 40 mass %.

The binding agent binds lubricating particle s in the lubricating coating 23. As the binding agent, an organic resin, an inorganic resin, or a mixture thereof can be used. In the case of using the organic resin, a thermosetting resin or a thermoplastic resin can be used. The thermosetting resin includes, for example, an epoxy resin, a polyimide resin, a polycarbodiimide resin, a polyethersulfone resin, a polyetheretherketone resin, phenolic resin, a furan resin, a urea resin, and an acrylic resin. The thermoplastic resin includes, for example, a polyamide-imide resin, a polyethylene resin, a polypropylene resin, a polystyrene resin, and an ethylene vinyl acetate resin.

In the case of using an inorganic resin as the binding agent, a polymetaloxane can be used. The polymetaloxane refers to a high polymer having a main chain skeleton made of repeating metal-oxygen bondings. Preferably, polytitanoxane (Ti—O) and polysiloxane (Si—O) are used. These inorganic resins are obtained by subjecting metal alkoxides to hydrolysis and condensation. The alkoxy group of the metal alkoxide is, for example, a lower alkoxy group such as methoxy group, ethoxy group, propoxy group, isopropoxy group, isobutoxy group, butoxy group, and tert-butoxy group. When the lubricant film 23 is set to be 100 mass %, the content of the binder is preferably 60 to 95 mass %.

When there is a need for dissolving or dispersing the lubricating particles and the binding agent, a solvent is used. The solvent is not limited in particular as long as it can subject constituents contained in the lubricating coating 23 to dispersion or dissolution. As the solvent, an organic solvent or water can be used. Examples of the organic solvent include toluene and isopropyl alcohol.

The lubricating coating 23 may contain other constituents as necessary. Examples of the other constituents include an anticorrosion, a corrosion inhibitor, a surfactant, a wax, a friction modifier, a pigment, and the like. The contents of the lubricating particles, the binding agent, the solvent, and the other constituents are set as appropriate.

The lubricating coating 23 is formed by applying and solidifying the previously described composite on the contact surface of at least one of the pin 3 and the box 6.

Referring to FIG. 3, in the case of a threaded connection for pipe or tube 50 in which the pin 3 and the box 6 are fastened on shipping, the lubricating coating 23 may be formed on only one of the contact surfaces of the pin 3 and the box 6 before the fastening. In this case, the coupling 2, having a short length, is easier to perform application operation of the composite than the main body 1, having a long length. For this reason, it is preferable to form the lubricating coating 23 on the contact surface of the box 6 of the coupling 2. In the threaded connection for pipe or tube 50, at a pipe leading end portion where the pin 3 and the box 6 are not fastened on shipping, the lubricating coating 23 may be formed on both of the contact surfaces of the pin 3 and the box 6 so that the contact surfaces are given an anticorrosion property as well as lubricity. Alternatively, the lubricating coating 23 may be formed on only one of the contact surfaces of the pin 3 and the box 6, and on the other contact surface, a solid anticorrosive coating to be described later may be formed. In both cases, it is possible to give galling resistance, gas-tightness, and an anticorrosion property to a thread.

It is preferable to cover the entire contact surface of at least one of the pin 3 and the box 6 with the lubricating coating 23. Only portion of the contact surface (e.g., only seal portions 8 and 10) may be covered with the lubricating coating 23.

The lubricating coating 23 may be single-layered or multi-layered. The term "multi-layered" refers to the state where the lubricating coating 23 is made up of two or more layers stacking from the contact surface side. The repetition of applying and solidifying the composite allows the lubricating coating 23 to be made up of two or more layers. The lubricating coating 23 may be formed directly on the contact surface or may be formed after preconditioning treatment to be described later.

A preferable thickness of the lubricating coating 23 is 5 to 50 μm. If the lubricating coating 23 has a thickness of 5 μm or more, it is possible to obtain a high lubricity stably. Meanwhile, if the lubricating coating 23 has a thickness of 50 μm or less, the adhesiveness of the lubricating coating 23 is stabilized. Furthermore, if the lubricating coating 23 has a thickness of 50 μm or less, the thread tolerance (clearance) of a sliding surface is widened, which reduces an interfacial pressure in sliding. For this reason, it is possible to suppress a fastening torque becoming excessively high. Therefore, a preferable thickness of the lubricating coating 23 is 5 to 50 μm.

The thickness of a lubricating coating layer 23 is measured by the following method. Under the same conditions as in the case of applying a lubricant coating layer 23 to a threaded connection for pipe or tube, a lubricant film is applied on a flat plate. Among the coating conditions of a threaded connection for pipe or tube and flat plate, the following conditions are to be matched; the distance between an object to be coated and a nozzle tip, injection pressure, viscosity of the composition, rotational speed of the object to be coated, and the like. To match the viscosity of the composition, the temperatures of a tank, a pipe, and a nozzle outlet, are to be matched between the threaded connection for pipe or tube and the plate. From the difference of the weight of the plate before applying the composition and the weight of the plate after applying the composition, the amount of the applied amount of the composition per unit time is calculated. The composition is solidified on the plate to form a lubricating coating layer 23. The thickness of the lubricating coating layer 23 is measured using a film thickness meter. From the difference of the weight of the plate before applying the composition and the weight of the plate after applying the composition, the weight of the lubricating coating layer 23 is calculated. From the film thickness and the weight of the lubricant coating layer 23, the density of the lubricant coating layer 23 is calculated. Next, from the thread shape and the size (inner diameter and thickness, and the like), the application target area of the threaded connection for pipe or tube is calculated. The application target area corresponds to the area of expanding the thread forming surface having unevenness into a plane surface. From the application time of the composition onto the threaded connection for pipe or tube, the application target area, and the density of and the lubricant coating layer 23, the average thickness of the lubricant coating layer 23 against the threaded connection for pipe or tube is calculated.

[Solid Anticorrosive Coating]

The previously-described threaded connection for pipe or tube 50 may include the lubricating coating 23 on the contact surface of one of the pin 3 and the box 6 and may include a solid anticorrosive coating on the contact surface of the other of the pin 3 and the box 6. As previously described, the threaded connection for pipe or tube 50 may be in storage for a long period until it is actually used. In this case, forming the solid anticorrosive coating increases the anticorrosion property of the pin 3 or the box 6.

Examples of the solid anticorrosive coating include chromate coating consisting of chromate. The chromate coating is formed by well-known trivalent chromate treatment.

The solid anticorrosive coating is not limited to a chromate coating. Another solid anticorrosive coating contains, for example, a UV cured resin. In this case, the solid anticorrosive coating has a strength with which the solid anticorrosive coating is not fractured by force applied to it in installing a protector. Furthermore, during transport or storage, the solid anticorrosive coating is not dissolved even when being exposed to water condensed for dew point reasons. Furthermore, the solid anticorrosive coating is not easily softened even at high temperature of more than 40° C. The UV cured resin is a well-known resin composite. The UV cured resin is not limited in particular as long as it contains a monomer, an oligomer and a photoinitiator and induces photo-polymerization reaction by irradiation with ultraviolet light so as to form a cured coating.

On the other contact surface of the threaded connection for pipe or tube 50, a plating layer may be formed, and on the plating layer, the previously described solid anticorrosive coating may be formed. Alternatively, the solid anticorrosive coating may be formed directly on the other contact surface.

[Base Material of Threaded Connection for Pipe or Tube 50]

The composition of a base material of the threaded connection for pipe or tube 50 is not limited in particular. Examples of the base material of the threaded connection for pipe or tube 50 include carbon steels, stainless steels, and alloy steels. Among the alloy steels, high alloy steels such as two-phase stainless steels containing an alloying element such as Cr, Ni, and Mo and Ni alloys have a high anticorrosion property. For this reason, using these high alloy steels as the base material of the threaded connection for pipe or tube 50 results in an excellent anticorrosion property in a corrosive environment containing hydrogen sulfide, carbon dioxide, and the like.

[Method for Producing]

Description will be made below about a method for producing the threaded connection for pipe or tube 50 according to the present embodiment.

The method for producing the threaded connection for pipe or tube 50 according to the present embodiment includes an electroplating step, a mechanical plating step, and a lubricating coating forming step.

[Electroplating Step]

In the electroplating step, the electroplating treatment is performed to form the first plating layer 21 on the contact surface of at least one of the pin 3 and the box 6. The electroplating treatment is performed by a well-known method. For example, the electroplating treatment is performed in such a manner that the contact surface of at least one of the pin 3 and the box 6 is immersed in a plating bath containing zinc ions and nickel ions, and turned on the electricity. As the plating bath, a commercial one is available. The plating bath preferably contains zinc ion: 1 to 100 g/L and nickel ion: 1 to 50 g/L. The treatment conditions for the electroplating treatment can be set as appropriate. The electroplating treatment conditions are, for example, plating bath pH: 1 to 10, plating bath temperature: 10 to 60° C., current density: 1 to 100 A/dm$^2$, and a treatment time period: 0.1 to 30 minutes. As previously described, a preferable thickness of the first plating layer 21 is 1 to 20 μm.

[Mechanical Plating Step]

In the mechanical plating step, dry mechanical plating treatment is performed to form the second plating layer 22, which is a mechanical plating layer, on the first plating layer 21. A dry mechanical plating method is, for example, a blast plating method in which a blasting device is used to cause particles to collide with an object to be plated. In the present embodiment, plating may be performed only on the contact surface. For this reason, the blast plating method, which enables the plating to be performed partially, is suitable.

The Particle used in the dry mechanical plating method such as the blast plating method is a metallic particle that includes Zn or a Zn alloy at least on its surface. The particle may be a metallic particle wholly consisting of Zn or a Zn alloy. A preferable blast medium is made up of a particle the core of which is Fe or a Fe alloy used in Patent Literature 1, having a surface covered with a Zn or Zn alloy layer via a Fe—Zn alloy layer. The particle is available, for example, under the trade name "Z Iron" from DOWA Iron Powder Industries Co., Ltd. A preferable size of the particle is 0.2 to 1.5 mm.

When the metallic particle having a Fe or Fe alloy core the surface of which is covered with Zn or a Zn alloy is subjected to blasting to the threaded connection for pipe or tube 50, only the Zn or the Zn alloy, the coating layer of the particle is adhered to the steel pipe. This forms the second plating layer 2, which is the mechanical plating layer made up of the Zn or the Zn alloy, on the first plating layer 21. The mechanical plating layer is porous, the porosity of which is 5 to 80%. For this reason, forming the lubricating coating 23 and the solid anticorrosive coating on the second plating layer 22 further increases the adhesiveness of the lubricating coating 23 and the solid anticorrosive coating due to what is called the "anchor effect". As previously described, a preferable thickness of the second plating layer 22 is 2 to 30 μm.

[Lubricating Coating Forming Step]

After the mechanical plating step, the lubricating coating forming step is performed. In the lubricating coating forming step, a composite for forming a lubricating coating (hereafter, also referred to as a composite) is first prepared. The composite is formed by mixing the previously described lubricating particle and binding agent. The composite may further contain the previously described solvent or other constituents.

The resultant composite is applied to the second plating layer 22. A method for the application is not limited in particular. For example, the composite containing the solvent is sprayed on the second plating layer 22 using a spray gun. In this case, the composite is applied on the second plating layer 22 uniformly. The pin 3 or the box 6 on which the composite is applied is subjected to drying or drying by heating. The drying by heating is performed by, for example, commercially available direct drying equipment or the like. This makes the composite cured to form the solid lubricating coating 23 on the second plating layer 22. Conditions for the drying by heating can be set as appropriate with the boiling point, melting point, and the like of each constituent contained in the composite taken into consideration.

In the case where the composite not containing the solvent is used to form the lubricating coating 23, a hot melt method can be used, for example. In the hot melt method, the composite is heated to get into a fluid state. The composite in the fluid state is sprayed with a spray gun having a temperature maintaining function. The composite is thereby applied on the second plating layer 22 uniformly. The heating temperature of the composite can be set as appropriate with the melting point and the softening temperature of the previously described binding agent and other constituents taken into consideration. The pin 3 or the box 6 on which the composite is applied is cooled by air cooling or the like. This makes the composite cured to form the lubricating coating 23 on the second plating layer 22.

[Forming Solid Anticorrosive Coating (Trivalent Chromate Treatment)]

As previously described, the electroplating step, the mechanical plating step, and the lubricating coating forming step are performed on the contact surface of one of the pin 3 and the box 6, so as to form the first plating layer 21, the second plating layer 22, and the lubricating coating 23.

Meanwhile, on the contact surface of the other of the pin 3 and the box 6, the first plating layer 21, the second plating layer 22, and the lubricating coating 23 may be formed, or a plating layer and/or a solid anticorrosive coating may be formed. Description will be made below about the case where the first plating layer 21 and the solid anticorrosive coating composed of the chromate coating is formed on the contact surface of the other of the pin 3 and the box 6.

In this case, the first plating layer 21 is formed by performing the previously described electroplating step. After performing the electroplating step, trivalent chromate treatment is performed to form the solid anticorrosive coating. The trivalent chromate treatment is treatment to form a coating of a trivalent chromate (chromate coating). The chromate coating formed by the trivalent chromate treatment suppresses white rust on the surface of a Zn-alloy-plating layer. This improves the appearance of a product (however, white rust on a Zn-alloy-plating layer is not rust of the threaded connection for pipe or tube 50 and thus has no influence on the galling resistance and anticorrosion property of the threaded connection for pipe or tube 50). The trivalent chromate treatment can be performed by a well-known method. For example, the contact surface at least one of the pin 3 and the box 6 is immersed in chromate treatment liquid, or the chromate treatment liquid is sprayed to be applied on the contact surface. Subsequently, the contact surface is rinsed. The contact surface may be rinsed after being immersed in the chromate treatment liquid and energized. The contact surface on which the chromate treatment liquid is applied may be subjected to drying by heating. The conditions for the trivalent chromate treatment can be set as appropriate.

[Pretreatment Step]

In the previously described producing steps, a pretreatment step may be included before the electroplating step, as necessary. Examples of the pretreatment step include pickling and alkaline degreasing. In the pretreatment step, oil content and the like adhered to the contact surface is cleaned off. The pretreatment step may further include grinding processing such as mechanical grinding finishing.

Through the above-described producing steps, the threaded connection for pipe or tube 50 according to the present embodiment is produced.

EXAMPLES

Examples will be described below. It should be noted that the present invention is not limited to the examples. In the examples, the contact surface of a pin will be referred to as a pin surface, and the contact surface of a box will be referred to as a box surface. In addition, the sign "%" in the examples means mass percent unless otherwise specified.

In the present examples, a threaded steel pipe called VAM21 (R) from NIPPON STEEL & SUMITOMO METAL CORPORATION was used. The steel pipe VAM21 (R) was a steel pipe having an outer diameter of 24.448 cm (9⅝ inches), and a wall thickness of 1.199 cm (0.472 inches). The steel pipe was made of a carbon steel, the chemical composition of which contained C: 0.21%, Si: 0.25%, Mn: 1.1%, P: 0.02%, S: 0.01%, Cu: 0.04%, Ni: 0.06%, Cr: 0.17%, and Mo: 0.04%, and the balance thereof was Fe and impurities.

A pin surface and a box surface for which a steel pipe of each test number is used were subjected to the mechanical grinding finishing (at a surface roughness of 3 μm). Subsequently, plating layers (first and second plating layers) or a coating (solid anticorrosive coating, lubricating coating) shown in Table 1 was formed, so as to prepare the pin and the box of each test number.

TABLE 1

| Test Number | Steel Grade | | Preconditioning Treatment Layer 1 (Thickness (μm)) | Preconditioning Treatment Layer 2 (Thickness (μm)) | Solid Anticorrosive Coating Layer (Thickness (μm)) | Lubricating Coating Layer (Thickness (μm)) |
|---|---|---|---|---|---|---|
| 1 | Carbon Steel | Pin Surface | Electroplating Layer (8 μm) | — | Chromate (Trivalent) (0.3 μm) | — |
| | | Box Surface | Electroplating Layer (8 μm) | Dry Mechanical Plating Layer (10 μm) | — | Solid Lubricant Coating Containing Graphite Of 5% By Mass, PTFE Of 4% By Mass, And PFPE Of 10% By Mass (30 μm) |
| 2 | Carbon Steel | Pin Surface | Electroplating Layer (8 μm) | — | Chromate (Trivalent) (0.3 μm) | — |
| | | Box Surface | Electroplating Layer (8 μm) | Dry Mechanical Plating Layer (10 μm) | — | Xylan1425 (30 μm) |
| 3 | Carbon Steel | Pin Surface | Electroplating Layer (8 μm) | Dry Mechanical Plating Layer (10 μm) | — | Defric coat 405 (20 μm) |
| | | Box Surface | Electroplating Layer (8 μm) | Dry Mechanical Plating Layer (10 μm) | — | Xylan1425 (30 μm) |
| 4 | Carbon Steel | Pin Surface | Electroplating Layer (8 μm) | — | Chromate (Trivalent) (0.3 μm) | — |
| | | Box Surface | Dry Mechanical Plating Layer (10 μm) | — | — | Xylan1425 (30 μm) |
| 5 | Carbon Steel | Pin Surface | Electroplating Layer (8 μm) | — | Chromate (Trivalent) (0.3 μm) | — |
| | | Box Surface | Electroplating Layer (8 μm) | — | — | Xylan1425 (30 μm) |

TABLE 1-continued

| Test Number | Steel Grade | | Preconditioning Treatment Layer 1 (Thickness (μm)) | Preconditioning Treatment Layer 2 (Thickness (μm)) | Solid Anticorrosive Coating Layer (Thickness (μm)) | Lubricating Coating Layer (Thickness (μm)) |
|---|---|---|---|---|---|---|
| 6 | Carbon Steel | Pin Surface | Electroplating Layer (8 μm) | — | Chromate (Trivalent) (0.3 μm) | — |
| | | Box Surface | Electroplating Layer (8 μm) | Manganese Phosphating Layer (12 μm) | — | Xylan1425 (30 μm) |

The method of forming plating layers or coatings was as follows. In each test number, the porosity was measured in a known method. The porosity of the electroplating layers were less than 5%, and the porosity of the dry mechanical plating layers were 5 to 80%. The porosity of the manganese phosphating layer was less than 30%.

[Test Number 1]

For the test number 1, a pin surface was plated with Zn—Ni electroplating (Daiwa Fine Chemicals Co., Ltd.) by electroplating, so as to form a first plating layer having a thickness of 8 μm. The conditions for the electroplating were plating bath pH: 6.5, plating bath temperature: 25° C., current density: 2 A/dm$^2$, and treatment time period: 18 minutes. The composition of the first plating layer was Zn: 85% and Ni: 15%. Furthermore, the obtained first plating layer was subjected to the trivalent chromate treatment. A trivalent chromate treatment liquid was one available under the trade name "DAIN Chromate TR-02" from Daiwa Fine Chemicals Co., Ltd. The conditions for the trivalent chromate treatment were bath pH: 4.0, bath temperature: 25° C., and treatment time period: 50 seconds.

Under the same conditions as those for the pin surface, a first plating layer was formed on a box surface. Subsequently, a second plating layer was formed by the dry mechanical plating treatment (blast plating method). In the dry mechanical plating treatment, a metallic particle including a coating consisting of a Zn—Fe alloy was used. The obtained second plating layer had an average film thickness of 10 μm. On the box surface with the first plating layer and the second plating layer formed thereon, a composite for forming a solid lubricant coating was applied. The composite for forming a solid lubricant coating contained graphite of 5% by mass, PTFE of 4% by mass, and PFPE of 10% by mass. The composite for forming a solid lubricant coating was heated to 130° C., sprayed to be applied, and cooled to form a solid lubricant coating having an average film thickness of 30 μm.

[Test Number 2]

For the test number 2, a pin surface was subjected to the same treatment as with the test number 1. The obtained first plating layer had the same film thickness and chemical composition as those of the test number 1. The thickness of a trivalent chromate coating was estimated to be the same as that of the test number 1. On a box surface, a first plating layer and a second plating layer were formed as with the test number 1, and subsequently, a composite for forming a solid lubricant coating under the trade name "Xylan1425" was applied. The trade name "Xylan1425" contained an epoxy-based resin of 22% by mass, PTFE particles of 9% by mass, a solvent of 18% by mass in total, a pigment, and water of 40% by mass. The composite for forming a solid lubricant coating was sprayed to be applied on the box surface, and then subjected to drying by heating (at 90° C. for five minutes) and curing treatment (at 210° C. for 20 minutes) to form a solid lubricant coating. The obtained solid lubricant coating had an average film thickness of 30 μm.

[Test Number 3]

For the test number 3, first plating layers and second plating layers were formed on a pin surface and a box surface, as with the box surface of the test number 1. Obtained first and second plating layers had the same film thicknesses and chemical compositions as those of the test number 1. Subsequently, on the pin surface, the following composite for forming a solid lubricant coating was applied. The composite for forming a solid lubricant coating was one available under the trade name "DEFRIC COAT 405" from Kawamura Research Lab., Inc., which contained molybdenum disulfide and graphite in an inorganic polymer binder. The composite for forming a solid lubricant coating was sprayed to be applied on the box surface, and then let stand in the atmosphere for three hours. Subsequently, the composite was exposed to humidified hot air at 150° C. for ten minutes. The obtained solid lubricant coating had an average film thickness of 20 μm. On the box surface, a solid lubricant coating was formed as with the box surface of the test number 2. The obtained solid lubricant coating had the same thickness and chemical composition as those of the box surface of the test number 2.

[Test Number 4]

For the test number 4, a first plating layer and a trivalent chromate coating were formed on a pin surface, as with the pin surface of the test number 1. The formed plating layer and coating had the same thicknesses as those of the test number 1. On the box surface, a second plating layer was formed as with the box surface of the test number 1. The obtained second plating layer had an average film thickness of 10 μm. On the obtained second plating layer, a solid lubricant coating was formed as with the box surface of the test number 2. The obtained solid lubricant coating had the same thickness and chemical composition as those of the box surface of the test number 2.

[Test Number 5]

For the test number 5, a first plating layer and a trivalent chromate coating were formed on a pin surface, as with the pin surface of the test number 1. The formed coating had the same thickness as that of the test number 1. On the box surface, a first plating layer was formed as with the pin surface of the test number 1. The formed first plating layer had the same thickness as that of the test number 1. On the obtained first plating layer, a solid lubricant coating was formed as with the box surface of the test number 2. The obtained solid lubricant coating had the same thickness and chemical composition as those of the box surface of the test number 2.

[Test Number 6]

For the test number 6, a first plating layer and a trivalent chromate coating were formed on a pin surface, as with the pin surface of the test number 1. The formed plating layer and coating had the same thicknesses as those of the test number 1. On the box surface, a first plating layer was formed as with the pin surface of the test number 1. The formed first plating layer had the same thickness as that of the test number 1. The box surface with the first plating layer formed thereon was immersed in manganese phosphate chemical treatment liquid at 80 to 95° C. for ten minutes, whereby a manganese phosphating layer having a thickness of 12 μm (at a surface roughness 10 μm) was formed. On the box surface with the manganese phosphating layer formed thereon, a solid lubricant coating was formed as with the box surface of the test number 2. The obtained solid lubricant coating had the same thickness and chemical composition as those of the box surface of the test number 2.

[Fastening/Loosening Evaluation Test]

As a fastening/loosening evaluation test, galling resistance and a torque property were evaluated. As the galling resistance, high-temperature resistance and an anti-misalignment property were evaluated.

[Galling Resistance: High-Temperature Resistance]

To investigate influences that layers on the first plating layer experience in a high-temperature oil well, a repetitive fastening test was conducted on the pins and the boxes of the test number 2 and the test number 6. Specifically, with the pin and the box fastened at the first fastening, the surroundings of the box were heated at 200° C. for six hours with a band heater. Subsequently, the pin and the box were loosened, and fastening and loosening were repeated. A fastening speed was 10 rpm at the beginning, then 2 rpm after shouldering. A fastening torque was 42.8 kN·m. The fastening and the loosening of the threaded connection for pipe or tube was performed at a normal temperature (20° C.). Everytime a set of fastening and the loosening were performed, occurrences of galling due to a torque change in fastening were checked visually. At a point in time when an unrepairable galling occurs, the test was terminated. Table 2 shows the results.

the fastening and loosening succeeded with no galling up to the second time, whereas unrepairable galling occurred at the third time, and thus the test was terminated.

[Galling Resistance: Anti-Misalignment Property]

The repetition of fastening and loosening with misalignment was performed on the pins and the boxes of the test number 1 to the test number 6 to evaluate the anti-misalignment property. A toe angle θ of the misalignment was 5°. The fastening and the loosening were repeated up to ten times. A fastening speed in the fastening and the loosening was 10 rpm, and a fastening torque was 42.8 kN·m. Whenever the fastening and the loosening were performed once, a pin surface and a box surface were observed visually. Through the visual observation, occurrences of galling were checked. When the galling was slight and thus repairable, a galling flaw was repaired, and the test was continued. The number of times up to which the fastening and the loosening succeeded without unrepairable galling occurring was measured. Table 2 shows the results.

[Evaluation Results]

Referring to Table 2, in the pins and the boxes of the test number 1 to the test number 3 and the test number 6, no galling due to misalignment occurred. This is considered to be due to the improvement of adhesiveness with the solid lubricant coating layer brought by the layers on the first plating layer. In contrast, in the test number 4 and the test number 5, the number of fastening was significantly reduced.

[Torque Property]

A torque property test was conducted on the pins and the boxes of the test number 1 to the test number 6. Specifically, a torque-on-shoulder value (the difference between a yield torque and a shouldering torque) was measured as follows. The pins and the boxes of the test number 1 to the test number 6 were prepared and fastened using a hydraulic power tong manufactured by Weatherford. Even after the

TABLE 2

| | Fastening/Loosening | | | | |
| --- | --- | --- | --- | --- | --- |
| | Galling Resistance (Number Of Fastening Succeeding With No Galling) | | Torque Property | Anticorrosion Property | Endurance Of Coating (Adhesiveness Of Lubricating Coating) |
| Test Number | High-Temperature Resistance 1) | Anti-Misalignment Property 2) | Torque-On-Shoulder Value 3) | Salt Spray Test (2000 Hours) 4) | Weather Resistant Test 5) |
| 1 | — | 10 | 125 | No Rust | No Coating Scaling-off |
| 2 | 10 | 10 | 140 | No Rust | No Coating Scaling-off |
| 3 | — | 10 | 115 | No Rust | No Coating Scaling-off |
| 4 | — | 2 | 75 | Rusting After 500 Hours | High Degree Of Coating Scaling-off/Rusting |
| 5 | — | 6 | 60 | No Rust | Medium Degree Of Coating Scaling-off |
| 6 | 2 | 10 | 95 | No Rust | No Coating Scaling-off |

(Note)
1) After First Fastening, Outer Circumference Of Box As Fastened Was Heated At 200° C. For 6 Hours Using Band Heater
2) Toe Angle θ Of Misalignment = 5°
3) Values Assuming That Torque-On-Shoulder Value Takes On 100 When API Dope Is Used In Place Of Solid Lubricant Coating
4) Compliant With JIS Z2371:2000 It Was Determined That There Was No Problem With Anticorrosion Property In Long Term Storage If No Rust Occurred For 1500 Hours Or More
5) See Table 3

[Evaluation Results]

Referring to Table 2, in the test number 2, no galling occurred after ten repetitions of fastening and loosening. In contrast, in the test number 6, the manganese phosphating layer of a preconditioning treatment layer 2 suffered high-temperature degradation. This is considered to be due to the elimination of crystal water, and embrittlement. As a result, fastening, the torque was provided to perform fastening, whereby a torque chart illustrated in FIG. 2 was created. On the torque chart, the torque-on-shoulder value was measured. The shouldering torque is a torque value at the time when a shoulder portion comes in contact, and a torque change begins to deviate from a first linear region (elastic deformation region). Meanwhile, the yield torque is a torque value at the time when plastic deformation begins. Specifically, the yield torque is a torque value at the time when deviation from a second linear region begins, the second linear region occurring after the torque reaches the shouldering torque. Here, there were prepared pins and boxes for which the preconditioning treatment layers 1 and 2, and the solid anticorrosive coating layers of the test numbers 1 to 6 were used and treated with the solid lubricant coating layer replaced with a grease that is compliant with the API standard. Assuming that the torque-on-shoulder value of this case is 100, values of the test number 1 to the test number 6 were determined. Table 2 shows the results.

[Evaluation Results]

Referring to Table 2, in the test number 1 to the test number 3, the second plating layers, which were mechanical plating layers, were formed, and thus the torque-on-shoulder values were more than 100, showing excellent torque properties. In contrast, in the test number 4 and the test number 5, the torque-on-shoulder values were less than 100, showing low torque properties. In the test number 6, a layer on the first plating layer was a manganese phosphating layer, and thus the torque-on-shoulder value was less than 100, showing a low torque property.

[Anticorrosion Property Evaluation Test: Salt Spray Test]

Specimens were prepared using a carbon steel having the same composition as that of the test number 1 to the test number 6. The specimens had a size of 70 mm×150 mm, and a thickness of 1 mm. The specimens were subjected to the same surface treatment as with the test number 1 to the test number 6, and a salt spray test was conducted on the specimens. The salt spray test was conducted based on the method described in JIS Z2371:2000. Through visual observation, a time point at which red rust occurred on the surface of the specimen of each test number was measured. Table 2 shows the results.

[Evaluation Results]

In the test number 1 to the test number 3, the test number 5, and the test number 6, electroplating layers were formed as the first plating layers, and thus rust did not occur. In contrast, in the test number 4, only the second plating layer, which is a porous mechanical plating layer, was formed right above the contact surface, and thus a sufficient anticorrosion effect was not obtained, resulting in rust occurring on the entire surface after 500 hours.

[Weather Resistance Test: Test for Endurance of Coating (Adhesiveness of Lubricating Coating)]

The boxes of the test number 1 to the test number 6 were prepared. The boxes were each cut off from the end of a pipe to have a length of 1 m. According to test weather conditions (humidity is relative humidity) and an order shown in Table 3, a weather resistance test was conducted that simulated a whole category of weathers ranging from extreme cold to high temperature. Box surfaces were visually observed to check the appearance of a solid lubricating coating (for scaling-off and the presence/absence of rust).

TABLE 3

| Climatic Order | Conditions | Temperature (° C.) | Humidity (%) | Test Period |
|---|---|---|---|---|
| 1 | Heat Degradation | +60 | Not Specified | 10 Days |
| 2 | Low-Temperature Exposure | −60 | Not Specified | 3 Days |
| 3 | Temperature Change | +20 −20 | 98 Not Specified | 4 Hours At Each Temperature 36 Cycles In Total |

TABLE 3-continued

| Climatic Order | Conditions | Temperature (° C.) | Humidity (%) | Test Period |
|---|---|---|---|---|
| 4 | High Temperature And Humidity | +40 | 98 | 5 Days |
| 5 | Oceanic Environment Exposure (Salt Spray) | −40 | Not Specified | 1 Hour |
| 6 | High-Temperature Steam Exposure | +100 | 98 | 1 Minute |

[Evaluation Results]

In the test number 1 to the test number 3 and the test number 6, both the first and second plating layers were formed, and thus the coating scaling-off did not occur, and rust did not occur, either. In contrast, in the test number 4, only the second plating layer, which is a mechanical plating layer, was formed on a surface, showing a low adhesiveness with a base material, which resulted in the coating scaling-off. Furthermore, a sufficient anticorrosion effect was not obtained, resulting in rust occurring on the entire surface after 500 hours. In the test number 5, only the first plating layer, which is an electroplating layer, was formed, showing a low adhesiveness with a lubricating coating, which resulted in the coating scaling-off.

As seen from the above, the embodiment according to the present invention has been described. However, the embodiment previously described is merely an example for practicing the present invention. Therefore, the present invention is not limited to the previously-described embodiment, and the previously-described embodiment can be modified and practiced as appropriate without departing from the scope of the present invention.

REFERENCE SIGNS LIST 3 pin
4, 5 thread portion
6 box
8, 10 metal seal portion
9, 11 shoulder portion
21 first plating layer
22 second plating layer
23 lubricating coating
50 threaded connection for pipe or tube

The invention claimed is:

1. A threaded connection for pipe or tube comprising a pin and a box, the pin and the box each including a contact surface that includes a thread portion and an unthreaded metal contact portion, the threaded connection for pipe or tube comprising:
   on the contact surface of at least one of the pin and the box,
   a first plating layer consisting of a Zn—Ni alloy;
   a second plating layer on the first plating layer, the second plating layer consisting of Zn or a Zn alloy, and being porous; and
   a lubricating coating on the second plating layer.

2. The threaded connection for pipe or tube according to claim 1, wherein the lubricating coating is a solid lubricant coating.

3. The threaded connection for pipe or tube according to claim 1, wherein the porosity of the second plating layer is 5 to 80%.

4. The threaded connection for pipe or tube according to claim 3, wherein the first plating layer has a thickness of 1 to 20 μm, the second plating layer has a thickness of 2 to 30 μm, and the lubricating coating has a thickness of 5 to 50 μm.

5. The threaded connection for pipe or tube according to claim 4, wherein the lubricating coating is a solid lubricant coating.

6. The threaded connection for pipe or tube according to claim 3, wherein the lubricating coating is a solid lubricant coating.

7. The threaded connection for pipe or tube according to claim 1, wherein the first plating layer has a thickness of 1 to 20 μm, the second plating layer has a thickness of 2 to 30 μm, and the lubricating coating has a thickness of 5 to 50 μm.

8. The threaded connection for pipe or tube according to claim 7, wherein the lubricating coating is a solid lubricant coating.

9. A method for producing a threaded connection for pipe or tube that includes a pin and a box, the pin and the box each including a contact surface that includes a thread portion and an unthreaded metal contact portion, the method comprising the steps of:

on the contact surface of at least one of the pin and the box, forming a first plating layer consisting of a Zn—Ni alloy by performing electroplating treatment;

forming a second plating layer consisting of Zn or a Zn alloy by performing mechanical plating treatment after forming the first plating layer; and forming a lubricating coating after forming the second plating layer.

\* \* \* \* \*